April 6, 1954  J. J. SLOMER  2,674,093
CONVEYER DRIVE AND BOOSTER FOR SHUTTLE CARS
Filed Dec. 21, 1951
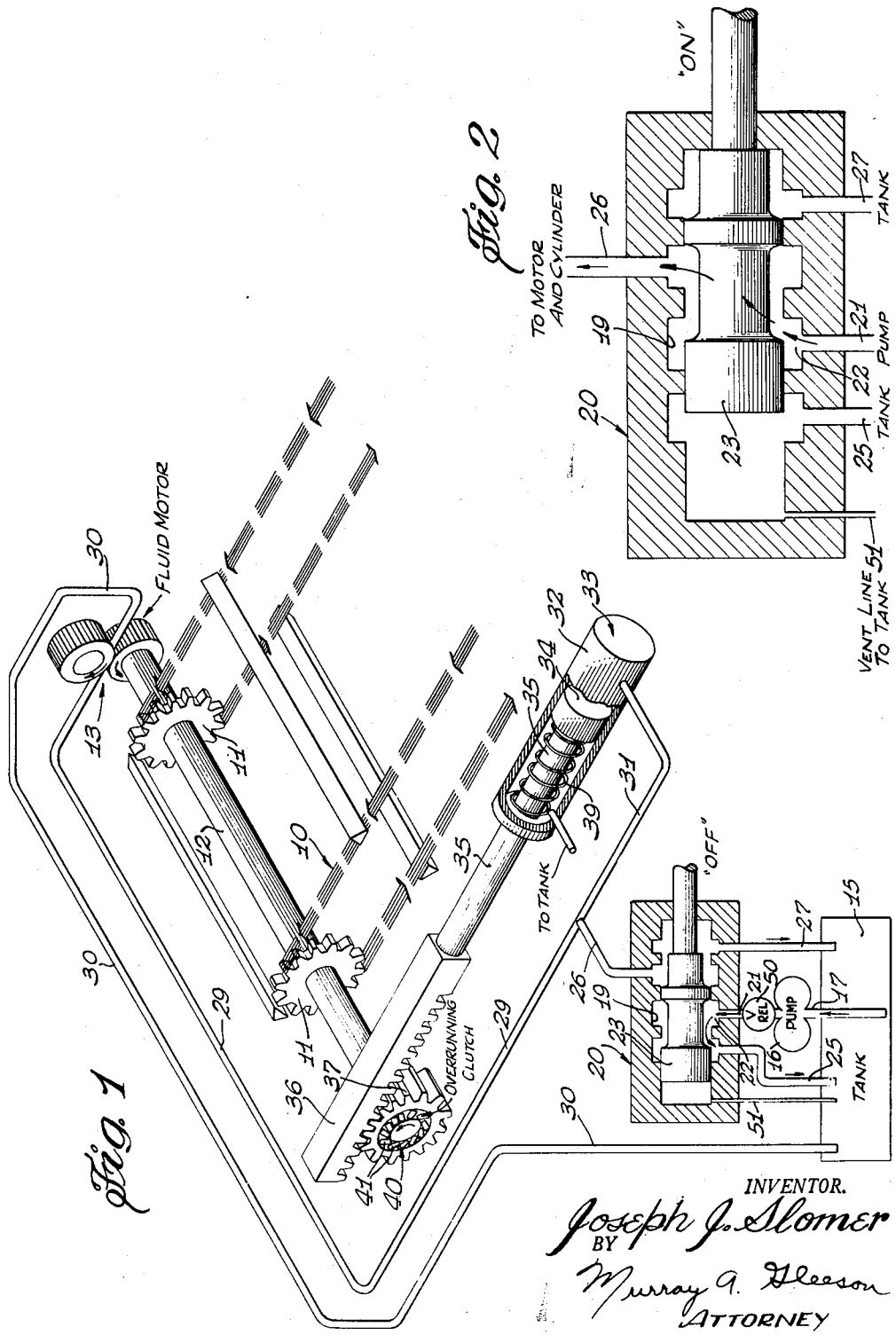
INVENTOR.
Joseph J. Slomer
BY
Murray A. Gleeson
ATTORNEY Patented Apr. 6, 1954

2,674,093

UNITED STATES PATENT OFFICE 2,674,093

CONVEYER DRIVE AND BOOSTER FOR SHUTTLE CARS

Joseph J. Slomer, Chicago, Ill., assignor to Goodman Manufacturing Company, Chicago, Ill., a corporation of Illinois Application December 21, 1951, Serial No. 262,835

5 Claims. (Cl. 60—53)

This invention relates to improvements in fluid-operated drive mechanisms for conveyors and particularly such conveyors as extend along the bottoms of shuttle cars operable in mines underground, and more particularly relates to a booster for the fluid-operated actuator for the conveyor, applying an added starting torque to the actuator and starting the conveyor when loaded.

Not only is the starting friction resistance of a stalled conveyor greater than the running friction resistance, but the stalled torque output of a rotative fluid-operated motor is less than the running torque output. In short, when such a fluid motor-operated conveyor is stopped, there is a greater load to be overcome and less torque available to overcome it than when running. This invention aims to correct these shortcomings by a booster which is automatically operable to increase the available starting torque.

Rubber tire mounted shuttle cars having a conveyor extending along the bottom thereof, for both loading and unloading the car, are frequently used in mines underground to carry the coal from the working place to a central unloading station. Since the space in which the shuttle car operates is confined, both as to vertical and lateral dimensions, compactness in construction and arrangement is of utmost importance. One way in which this compactness has been attained has been to drive the conveyor and many of the other operating parts of the car by individual fluid-operated motors. While such motors have been generally satisfactory as a drive means for the conveyor, the conveyor is intermittently operated many times during the operation of loading the car, and, when unloading, the car is started when fully loaded with coal between the side walls thereof. The starting torque required to start the conveyor when fully loaded both during loading and unloading the car is frequently so great as to stall the fluid motor and conveyor.

A principal object of my invention is to overcome these difficulties by providing a booster mechanism in the drive to the conveyor, effective to automatically start the conveyor and relieve the hydraulic motor from excessive starting torque loads.

Another object of my invention is to provide a fluid-operated system for driving conveyors, such as are used in shuttle cars in mines underground including a fluid-operated motor for driving the conveyor and a booster motor connected in the hydraulic supply line in parallel with the fluid-operated motor, and supplying sufficient starting torque to the conveyor drive shaft to overcome the low starting torque of the conveyor drive motor, and assure starting of the conveyor under excessive load conditions.

A still further object of my invention is to provide a fluid-operated drive particularly adapted to drive a conveyor for a shuttle car operable in mines underground together with a starting booster therefor including a fluid-operated cylinder and piston connected in parallel with the conveyor drive motor for initially starting the conveyor.

Still another and more detailed object of my invention is to provide a hydraulic conveyor drive mechanism of a novel and improved form particularly adapted to drive conveyors subjected to heavy starting loads including a fluid-operated motor of a rotating type having drive connection with the conveyor drive shaft, a second fluid-operated motor of the rectilinearly movable type connected in the fluid line in parallel with the rotating motor, a rack operated by the rectilinearly movable motor, a gear driven thereby, and an over-running clutch connecting the gear to the conveyor drive shaft to start the conveyor.

These and other objects of my invention will appear from time to time as the following specification proceeds and with reference to the accompanying drawing wherein:

Figure 1 is a diagrammatic view diagrammatically showing a conveyor and a fluid-operated drive and booster system therefor with the control valve, therefore, in an "off" position; and Figure 2 is a fragmentary diagrammatic view somewhat similar to Figure 1, but showing the control valve in an "on" position.

In the embodiment of my invention illustrated in the drawing, a conveyor 10 is shown, which may be any form desired, but which is herein shown as being a chain and flight conveyor, which may extend along the bottom plate of a shuttle car to progress material therealong from one end thereof to the other, and may be trained about drive sprockets 11, 11 on a transverse drive shaft 12 at the discharge end of the conveyor.

A fluid actuator 13, herein shown as being a well known form of gear type fluid-operated motor is diagrammatically shown as driving the shaft 12 from one end of said shaft. A source of supply for fluid under pressure to said motor is shown as comprising a fluid storage tank 15, a pump 16, which may be of any well known form, but is herein diagrammatically shown as being a conventional gear pump connected at its intake side with the storage tank 15 by means of a pipe or conduit 17. The pressure side of the pump 16 is shown as being connected with a valve chamber 19 of a fluid control valve 20 by means of a pipe or conduit 21 communicating with a port 22 located centrally of said valve chamber. A pressure relief valve 50 is interposed between the pump 16 and valve 20.

The valve 20 may be of any well known form and is herein shown as being a well known form of piston or spool type valve including a valve spool 23 movable into one position as shown in Figure 1, to by-pass fluid from the valve chamber 19 and pressure line 21 back to the storage tank 15 through a return line 25, and to pass fluid from said valve chamber and a pressure line 26, leading from said valve chamber back to the storage tank 15, through a return line 27. A tank connection 51 vents fluid from the head end of the valve when the spool 23 is moved from its Fig. 2 to its Fig. 1 position.

The valve spool 23 is also movable to the position as shown in Fig. 2, in which the valve spool 23 defines a fluid passageway from the pressure line 21 through the valve chamber 19 to the pressure line 26, and blocks the passage of fluid to the return lines 25 and 27.

The pressure line 26 is herein shown as being connected with a pressure line 29, connected with the fluid motor 13 for supplying fluid under pressure thereto to operate said motor. A return line 30 leads from the motor 13 back to the tank 15, to return fluid thereto.

The pressure line 26 also communicates with a pressure line 31 leading to a fluid actuator or motor 33. The motor 33 is herein shown as being a cylinder 32 having a piston 34 therein. The pressure line 31 communicates with the interior of the fluid pressure cylinder 32, and connects said cylinder to the source of fluid under pressure in parallel with the motor 13. A piston rod 35 is shown as extending from the piston 34 and through the piston rod end of the cylinder. A rack 36 is shown on the end of the piston rod 35 and may either be integral therewith or connected thereto. The teeth of the rack 36 mesh with a pinion 37 coaxial with the conveyor drive shaft 12. A spring 39 is interposed between the piston rod end of the cylinder 32 and the piston 34, to return said piston upon the relief of pressure within said cylinder. The spring 39 may be so proportioned as to return the piston 34 upon the reduction in pressure which would be attained when the fluid motor 13 starts from a stalled to a normally-running condition. Thus, the spring may be proportioned to hold the piston 34 and piston rod 35 in a retracted position within the cylinder 32, except when the fluid motor 13 stalls or is stopped and the motor 33 is required to start said motor.

The drive connection from the gear 37 to the shaft 12 is herein shown as being an over-running clutch 40 interposed between the pinion 37 and the shaft 12 and diagrammatically shown as being contained within said pinion. The over-running clutch 40 may be of any well known form, and is herein shown as a sprag type of over-running clutch known to the trade as the "Formsprag" over-running clutch and manufactured by the Gear Grinding Machine Company, Detroit, Michigan, and no part of my present invention, so not herein shown or described in detail. The clutch 40 includes generally a plurality of sprags 41, 41 interposed between an outer race, which may be the periphery of the shaft 12 and an inner race, which may be the inner periphery of the gear or pinion 37. A suitable means (not shown), may be included to hold the sprags in the correct angular relation with respect to the races and to maintain contact between the sprags and races. When the pinion 37 is rotated by the rack 36 in one direction, which in the drawing is shown as being a counter-clockwise direction, the sprags 41, 41 will wedge between the outer periphery of the shaft 12 and the outer race and provide a positive drive for said shaft from the pinion 37. When, however, the speed of the shaft 12 may exceed the speed of the pinion 37, the spring 39 may return the rack 36, provided the pressure has been reduced so the force exerted by the spring 39 will overbalance the pressure of fluid within the cylinder 32. Where the pressure acting on the piston 34 within the cylinder 32 is sufficiently high to prevent the return of the rack 36, said rack and the pinion 37 may remain stationary with respect to the shaft 12, allowing the motor 13 to drive said shaft.

During operation of the conveyor, when the conveyor is loaded and the valve 20 is turned to its on position as shown in Figure 2, fluid under pressure will be supplied to the fluid motor 13 through the pressure line 29 and will also be supplied to the head end of the cylinder 32 of the fluid motor 33 through the fluid pressure line 31. Where the conveyor 10 is loaded and the torque of the motor 13 may be insufficient to start said conveyor, the pressure in the pressure line 31 will exert pressure against the piston 34 and counteract the spring pressure acting against the said piston, and extend the piston rod 35 from the cylinder 32 and rotate the pinion 37 and shaft 12 by means of the rack 36 and over-running clutch 40. This will start the conveyor 10 and the motor 13. After said motor has started, it will continuously operate the shaft 12 and conveyor 10 as long as pressure is supplied thereto through the pressure line 29. As the motor 13 is started, the spring 39 will tend to overbalance the pressure tending to hold the piston 34 in an extended position along the cylinder 32, to return the piston 34 toward the head end of the cylinder 32 into position to again boost and start the motor 13 and will return said piston, upon a reduction in pressure in the pressure line 31 beneath spring pressure.

It should here be noted that if the pressures within the cylinder 32 should not be reduced sufficiently to be overbalanced by the spring 39, the piston 34 may remain in an extended position while the conveyor is driven directly from the fluid motor 13, where, however, the piston 34 is extended for the full length of its stroke to start the motor 13, and pressures may be reduced in the line 31 and cylinder 32 when the motor starts, to the extent that the pressure in said cylinder will be overbalanced by the spring 39, the piston 34 will return into position to again boost the motor 13, should there be a tendency for said motor to stall, regardless of whether the valve 20 may be turned to an off position to relieve pressure from the pressure line 26.

The piston 34 is thus always returned into position to boost the motor 13 when it is desired to start the conveyor 10, regardless of whether the pressure in the line 31 and cylinder 32 may be reduced by a reduction in load to the extent where the pressure within the cylinder 32 may be overbalanced by the spring 39, or may be sufficient to hold said piston in its extended position along said cylinder during the full period the conveyor is in operation.

It may be seen from the foregoing that a simplified form of device has been provided to overcome the low starting torque of the motor 13 and positively start said motor when required, and that when the motor 13 stops, the booster device returns to its initial starting position to again boost the motor 13 when starting, and when the motor 13 is once started, the booster device may either return to a partially retracted initial starting position against rotation of the shaft 12 where there is a sufficient reduction in pressure in the pressure line 31, or may remain in its extended position while the shaft is continuously rotated by the motor 13.

It will be understood that modifications and variations may be effected without departing from the scope of the novel concepts of the present invention.

I claim as my invention:

1. In a fluid pressure system including a fluid storage tank, a pump, a fluid actuator comprising a rotatable fluid motor, a control valve connected between said pump and motor to supply fluid pressure thereto, a second fluid actuator comprising a rectilinearly movable fluid motor, means connecting said actuators to said control valve and pump in parallel with each other, a shaft connected to be driven by the first of said actuators, geared drive means to said shaft operated by the second of said actuators and including a pinion operated by the second of said actuators and an over-running clutch connecting said pinion with said shaft to rotate said shaft in one direction only, and to accommodate said pinion to freely rotate with respect to said shaft in a reverse direction to the direction said shaft is driven by the first of said actuators.

2. A hydraulic conveyor drive comprising a conveyor drive shaft, a rotatable fluid motor having driving connection with said shaft, a source of hydraulic fluid under pressure, a pressure line connected from said source to said motor for operating the same, and means for boosting said motor to start the same where the starting torque thereof is insufficient to rotate said shaft including a second fluid motor having a cylinder and piston, a gear operated thereby, an over-running clutch connecting said gear to said shaft, and a fluid pressure connection from said pressure line to said cylinder connecting said cylinder in parallel with said first motor.

3. A hydraulic conveyor drive comprising a conveyor drive shaft, a rotatable fluid motor having driving connection with said shaft adjacent one end thereof, a booster gear coaxial with said shaft, an overrunning clutch interposed between said gear and said shaft, connecting said gear to drive said shaft in one direction only, a rack meshing with said gear, a fluid pressure motor for operating said rack, and a source of fluid under pressure connected with each of said motors to operate said first motor and continuously supply fluid under pressure to said second motor, to supply starting boosting effort for said first motor.

4. A hydraulic conveyor drive comprising a conveyor drive shaft, a rotatable fluid motor having driving connection with said shaft adjacent one end thereof, a booster gear coaxial with said shaft adjacent the opposite end thereof, an over-running clutch connecting said gear with said shaft to drive said shaft in one direction only, a rack meshing with said gear, a booster motor comprising a cylinder having a piston therein, an operative connection between said piston and rack to operate the same in one direction upon the application of fluid under pressure to said cylinder, means returning said rack with respect to said cylinder upon a reduction in pressure therein, a source of hydraulic fluid under pressure, and fluid pressure connections from said source to said motors connecting said motors to said source in parallel, to operate said second motor to start the conveyor and boost said first motor and start the same.

5. In a hydraulic drive mechanism particularly adapted to drive shuttle car conveyors, a drive shaft, a rotatable gear type of fluid motor having drive connection with said shaft adjacent one end thereof, a source of hydraulic fluid under pressure, a control valve connected therewith, a pressure line connecting said valve with said motor for operating the same, means boosting said first motor to start the same when the load thereon exceeds the starting torque thereof comprising a booster motor including a cylinder having a piston therein and a piston rod extensible from said cylinder, a rack connected with said piston rod, a pinion coaxial with said shaft and rotatably driven by said rack, a spring overbalancing normal pump pressure within said cylinder retractably moving said piston and piston rod with respect to said cylinder, an over-running clutch connecting said pinion with said shaft to rotate said shaft in one direction only, and a fluid pressure connection from said valve to the head end of said cylinder, connecting said cylinder with said source of supply of fluid under pressure in parallel with said first motor, to operate said booster motor upon the building up of pressure in said pressure line by the failure of said first motor to start.

References Cited in the file of this patent

UNITED STATES PATENTS

| Number | Name | Date |
|---|---|---|
| 1,160,371 | Brown | Nov. 16, 1915 |
| 1,829,655 | Huguenin | Oct. 27, 1931 |
| 2,153,637 | Niven et al. | Apr. 11, 1939 |
| 2,370,526 | Doran | Feb. 27, 1945 |
| 2,398,265 | Tyler | Apr. 9, 1946 |
| 2,586,630 | Erland | Feb. 19, 1952 |
| 2,595,336 | Corsentino | May 6, 1952 |
| 2,626,504 | Frisone | Jan. 27, 1953 |

FOREIGN PATENTS

| Number | Country | Date |
|---|---|---|
| 241,234 | Great Britain | Oct. 12, 1925 |